United States Patent

[11] 3,579,246

[72] Inventors Theodore Lauer Rhyne
Summit, N.J.;
Karl F. McCready, San Pedro, Calif.
[21] Appl. No. 804,079
[22] Filed Mar. 4, 1969
[45] Patented May 18, 1971
[73] Assignee Northrop Corporation
Beverly Hills, Calif.

[54] TIME SHARING RECORDER DRIVE CIRCUIT
4 Claims, 14 Drawing Figs.

[52] U.S. Cl. ........ 346/34, 346/8, 346/44
[51] Int. Cl. ........ G01d 9/00
[50] Field of Search ........ 346/8, 44, 39, 62, 66; 340/411

[56] References Cited
UNITED STATES PATENTS
3,340,537 9/1967 Long et al. ........ 346/34
3,430,256 2/1969 Goodman ........ 346/34

*Primary Examiner*—Stephen J. Tomsky
*Assistant Examiner*—Edith C. Simmons
*Attorney*—Sokolski & Wohlgemuth

ABSTRACT: Navigational signals having pulse widths in accordance with navigational lines of position are fed to logical gating circuitry, including a pair of AND gates and an OR gate, the outputs of the AND gates being fed to an OR gate. The AND gates are alternately gated ON by means of a flip-flop, the OR gate output thus alternately including the signals fed to each of the AND gates. The output of the OR gate is utilized to control a switching circuit which controls the current to the magnetic drive coil of a chart recorder, the writing element of the recorder being successively deflected to positions indicative of the signals fed to each AND gate in accordance with the average current in the drive coil.

INVENTORS
THEODORE L. RHYNE
KARL F. McCREADY
BY
SOKOLSKI & WOHLGEMUTH
ATTORNEYS

*INVENTORS*
THEODORE L. RHYNE
KARL F. McCREADY
BY
SOKOLSKI & WOHLGEMUTH
ATTORNEYS

*INVENTORS*
THEODORE L. RHYNE
KARL F. M^c CREADY
*BY*
SOKOLSKI & WOHLGEMUTH
ATTORNEYS

TIME SHARING RECORDER DRIVE CIRCUIT

This invention relates to a recorder drive circuit and more particularly to such a circuit for controlling the recordation of navigational information on a magnetically driven recorder, on a time-sharing basis.

In certain long range navigational systems suited for shipboard or airborne use, signals having pulse widths in accordance with a line of position are generated by measuring the phase difference between radio frequency signals received from two widely separated radio transmitters. In devices of the prior art, each phase difference measurement is converted from its pulse form to an analog signal, such analog signal being amplified in a linear amplifier and then used to drive a chart recorder.

In this type of prior art implementation, a separate recorder must be utilized for each such line of position input. Further, the circuitry involved in the conversion to analog form and the processing of the analog signals to provide the necessary drive signal, is somewhat complicated and expensive.

The circuitry of this invention overcomes the shortcomings of prior art implementations by avoiding the necessity for a signal conversion and rather utilizing the signals in their detected pulse form to drive the recorder. In addition, means are provided in the circuitry of this invention for time sharing the recorder so that two signals can be recorded thereon, thereby improving the recorder utilization. Thus, the device of this invention provides simple and economical circuitry for recording such navigational signals and further adds to economy by lessening the number of recorders required.

It is therefore the principal object of this invention to simplify and economize the recordation of navigational signals on chart recorders.

Figure 1:
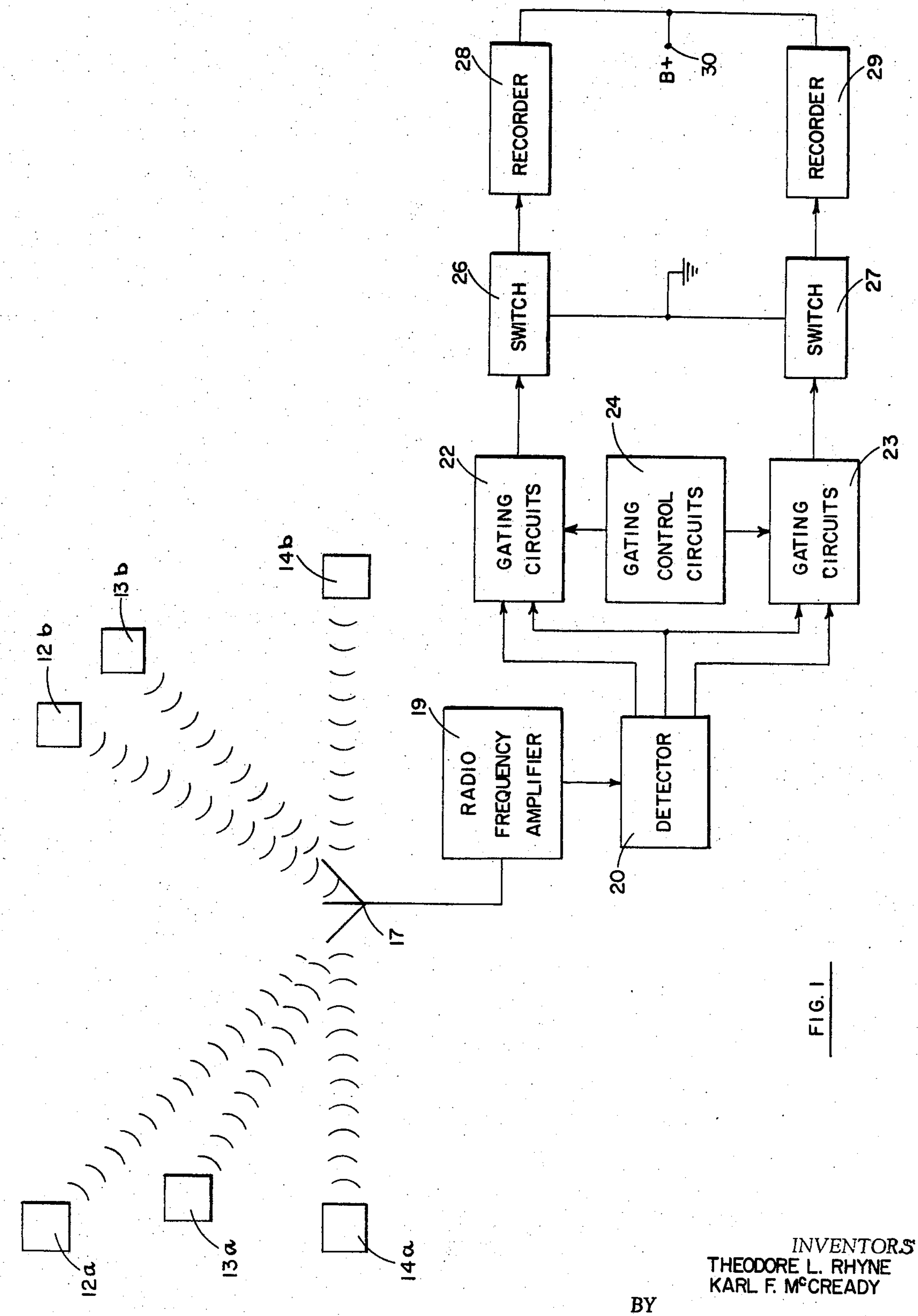
Figure 3A:
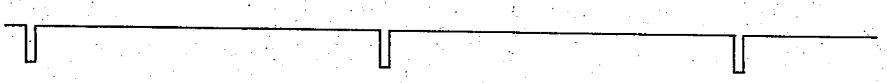
Figure 3B:
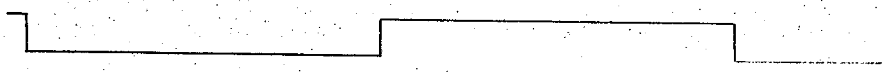
Figure 3C:
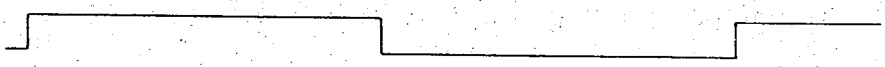
Figure 3D:
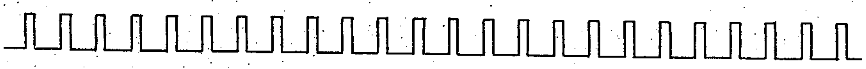
Figure 3E:
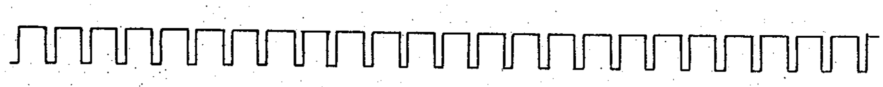
Figure 3F:
Figure 3G:
Figure 3H:
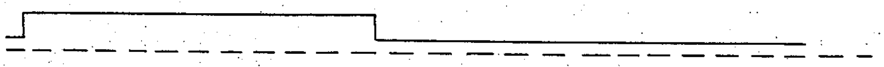
Figure 3I:
Figure 3J:
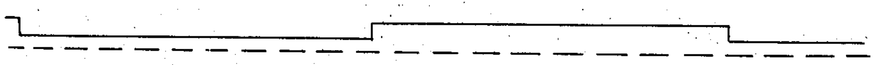
Figure 2:
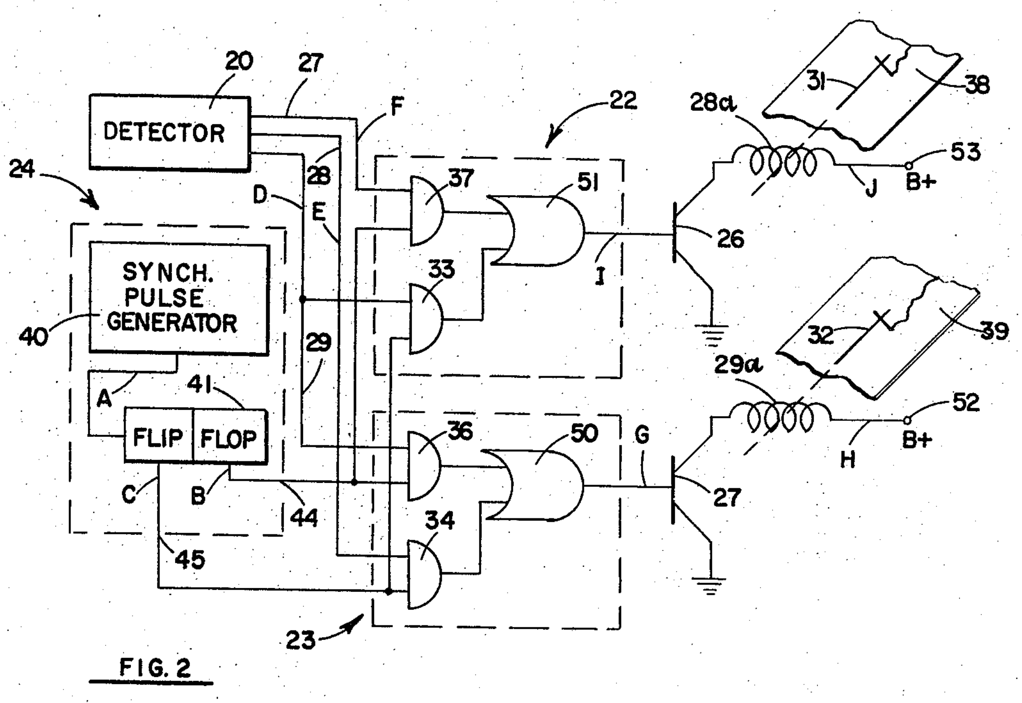
Figure 4A:
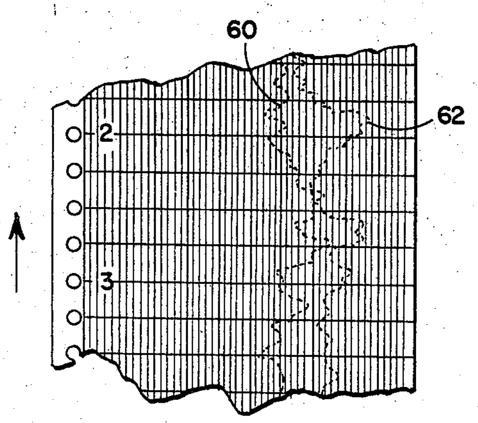
Figure 4B:
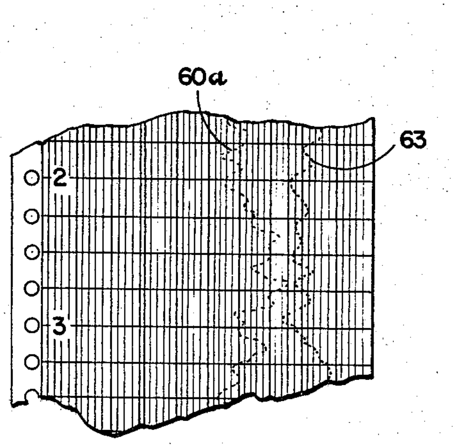

Other objects of this invention will become apparent from the following description taken in connection with the accompanying drawings, of which:

FIG. 1 is a block diagram illustrating the operation of the device of the invention, FIG. 2 is a functional block diagram illustrating the details of the logical control circuitry of the device of the invention, FIGS. 3A—3J illustrate the various wave forms generated in the circuitry of FIG. 2 as shown in their relative time sequence, and FIGS. 4A and 4B illustrate typical recordings obtained with the device of the invention.

Briefly described, the circuit of the invention includes logical gating circuitry including a pair of AND gates, the outputs of which are fed to an OR gate. The AND gates are alternately gated ON and OFF by means of a flip-flop which is triggered to opposite states at a predetermined rate by the output of a pulse generator. Separate navigational signals in the form of pulses having widths in accordance with lines of position are fed to each AND gate. The output of the OR gate, which alternately includes each of the navigational signals on a time-sharing basis, is used to control a switching circuit. The switching circuit controls the current to the magnetic drive coil of a chart recorder write arm, the write arm being successively deflected to positions indicative of the signals fed to each AND gate in accordance with the average current in the drive coil.

Referring now to FIG. 1, a block diagram of the device of the invention is shown. Pairs of transmitting stations 12*a*, 12*b;* 13*a*, 13*b;* and 14*a*, 14*b* send out radio signals in predetermined sequence, such signals being received by radio antenna 17. The transmissions of each pair of stations are synchronized with each other so that simultaneous transmissions occur for each pair. In typical operating systems, these signals are transmitted at a very low frequency (e.g., 10kHz.). The received signals are amplified by radio frequency amplifier 19 and detected in detector 20. Detector 20 comprises circuitry which determines the phase difference between the two signals received from each transmitter pair, the outputs of detector 20 being signals having the frequency of the input signals and pulse widths in accordance with these phase differences.

The square wave outputs of detector 20 are fed to gating circuits 22 and 23. Gating circuits 22 and 23 are controlled by gating control circuitry 24, as to be explained more fully in connection with FIG. 2, such that the two inputs fed to each of the gating circuits 22 and 23 from detector 20 are alternately fed as control signals to switches 26 and 27 respectively. Switches 26 and 27 are connected to the drive circuits of recorders 28 and 29 respectively, the switches completing the current path through the recorder drive coils from the B+ supply fed to terminal 30, as to be explained fully in connection with FIG. 2. It is to be noted at this point that radiofrequency amplifier 19 and detector 20 in themselves form no part of the present invention, this invention rather being concerned with the processing of the outputs of detector 20 for recordation on recorders 28 and 29.

Referring now to FIGS. 2 and 3A—3J, a functional schematic drawing of a preferred embodiment of the device of the invention and various wave forms generated thereby are respectively illustrated. For convenience of illustration, the corresponding letters for each of the wave forms in FIGS. 3A—3J are indicated in FIG. 2 where they appear.

The outputs of detector 20 are shown in FIGS. 3D, 3E and 3F. As already noted, these outputs are square waves in which the time durations or widths of the positive going portions represent the phase differences between associated pairs of signals. Thus, in the example shown in FIG. 3D, a phase difference of 25 percent of 360°, or 90°, is represented, while FIG. 3E shows a wave form with a phasal difference of 75 percent, or 270°, and FIG. 3F represents a 50 percent, or 180°, phase difference. The wave form of FIG. 3D is fed on line 29 to AND gates 33 and 36. The wave form of FIG. 3E is fed on line 28 to AND gate 34. The wave form of FIG. 3F is fed on line 27 to AND gate 37.

The gating control circuitry 24 for controlling the AND gates is provided by means of synch pulse generator 40 and a bistable switch means in the form of flip-flop 41. Synch pulse generator 40, which may be any suitable free-running oscillator, has a series of negative going output pulses as illustrated in FIG. 3A, these pulses being fed to the control elements of flip-flop 41. Flip-flop 41 is thus driven so that its stages alternately to to conduction and nonconduction in response to the input pulses fed thereto from synch pulse generator 40.

The outputs of the two stages of the flip-flop are indicated in FIGS. 3B and 3C, these outputs being fed on lines 44 and 45 respectively to the various AND gates, line 44 being connected to AND gates 36 and 37, while line 45 is connected to AND gates 33 and 34. Thus, it can be seen that when AND gates 33 and 34 are gated ON in response to the signal on line 45, AND gates 36 and 37 are gated OFF in response to the signal on line 44 and vice versa.

The outputs of AND gates 34 and 36 are fed to OR gate 50 while the outputs of AND gates 33 and 37 are fed to OR gate 51. OR gate 50 will thus have the output indicated in FIG. 3G, which alternately includes the signals fed to AND gates 34 and 36, i.e., the signals of FIGS. 3E and 3D respectively, while the output of OR gate 51 is as shown in FIG. 3I, which alternately provides the signals fed to AND gates 33 and 37, i.e., the signals of FIGS. 3D and 3F respectively.

It is to be noted that the signal of FIG. 3D appears redundantly in both OR gate outputs. This, as to be explained more fully in connection with FIGS. 4A and 4B, provides a convenient time correlation between the recordings made on the two recorders.

The output of OR gate 50 is fed to transistor 27 which provides a switching circuit to permit current flow through recorder drive coil 29*a* from the B+ power fed to terminal 52. In the same manner, drive current is provided in response to the output of OR gate 51 through recorder drive coil 28*a* from the B+ fed to terminal 53 by means of transistor switch 26. The average current in drive coils 29*a* and 28*a* is shown in FIGS. 3H and 3J repectively. It is to be noted that the average current through coil 29*a* is in response to the pulse signals shown in FIG. 3G, while the average current through coil 28*a* is in response to the pulses shown in FIG. 3I. Drive coils 28*a* and 29*a* are utilized to drive write arms 31 and 32 respectively which carry pen recorder or the like. These units operate in the nature of a galvanometer drive, pulsations present in the input to switches 26 and 27 being smoothed out by virtue of the inertia in this type of movement. Thus, the recorder arms are driven a distance in accordance with the average current fed to their drive coils and when they reach their maximum deflection in accordance with such average current, the write arms are appropriately impelled to provide a dot on the associated recorder chart 38 or 39 at this point.

Referring now to FIGS. 4A and 4B, typical chart traces which may be made with the device of this invention are illustrated. It is to be noted that the type of recording contemplated with the device of this invention is at a very slow speed, i.e., a single scan or complete excursion of each write arm taking in the neighborhood of a number of seconds. The numbers 2 and 3, shown on the left side of the chart indicate the time base. Trace 60 on the chart of FIG. 4A and trace 60*a* on the chart of FIG. 4B, both indicate a readout in response to the same input signal, i.e., the signal of FIG. 3D. This redundancy can thus be utilized to correlate the true time relationship between the signals recorded on the two charts. Thus, if there is some discrepancy in the time scales on the two charts, the signals can still readily be time correlated by comparing the traces common to both such charts. Traces 62 and 63 of course represent the other two recorder signals, i.e., those of FIGS. 3E and 3F.

The circuitry of this invention thus provides simple yet highly effective means for recording pulse signals indicative of navigational lines of position directly onto a recorder, on a time sharing basis.

We claim:

1. In apparatus for recording a plurality of navigational signals consisting of a series of pulses having a width indicative of a line of position, means for recording said signals on a time-sharing basis comprising:

a pair of AND gates, a flip-flop circuit, a pulse generator connected to said flip-flop circuit, the stages of said flip-flop circuit being alternately driven to opposite states by said pulse generator output, one of said AND gates being connected to receive the output of one of said flip-flop stages and one of said signals, the other of said AND gates being connected to receive the outputs of the other of said flip-flop stages and another of said signals, an OR gate for receiving the outputs of said AND gates, recorder means including a write arm and a drive coil for providing drive for said arm, a power source, and switch means responsively connected to the output of said OR gate for connecting said power source to said recorder means drive coil to drive said write arm in accordance with the average current in said coil, thereby providing successive recordings of each of said signals.

2. The apparatus of claim 1 and additionally including:

a second pair of AND gates, a second OR gate for receiving the outputs of said second pair of AND gates, and second recorder means for receiving the output of said second OR gate, said second recorder means being similar to said first-mentioned recorder means, each gate of said second pair of AND gates being connected to receive the output of a separate one of said flip-flop stages, said one of said signals being fed to one of the gates of said second pair of AND gates, still another of said signals being fed to the other gate of said second pair of AND gates, whereby said one of said signals provides a signal for correlating the timing of the two recorder means.

3. A time-sharing recorder drive circuit for recording a plurality of navigational signals, each of said signals consisting of a series of pulses having a width indicative of a navigational line of position comprising:

first and second AND gates, a separate one of said signals being fed to each of said AND gates, bistable switch means for alternately gating said first and second AND gates ON, OR gate means connected to receive the outputs of said AND gates, recorder means including a write arm and a drive coil for providing drive for said arm, a power source, and switch means operative in response to said OR gate means for connecting said power source to said recorder drive coil in accordance with the pulse signal outputs of said AND gates, said arm being deflected in accordance with the average current in said coil, thereby successively providing recordings of each of the signals fed to said AND gates.

4. The apparatus of claim 3 and additionally including:

third and fourth AND gates, the signal fed to said first AND gate also being fed to said third AND gate, an additional one of said signals being fed to said fourth AND gate, said bistable switch means being connected to said third and fourth AND gates to alternately gate said third and fourth gates ON, second OR gate means connected to receive the outputs of said third and fourth AND gates, second recorder means including a write arm and a drive coil for providing drive for said arm, and second switch means operative in response to said second OR gate means for connecting said power source to said second recorder means drive coil, said second recorder means arm being deflected in accordance with the average current in said second recorder means drive coil, whereby said signal fed to said first and third AND gates provides a reference for correlating the timing of said two recorder means.